(12) United States Patent
Hori

(10) Patent No.: US 8,059,302 B2
(45) Date of Patent: Nov. 15, 2011

(54) PHOTOPRINTER THAT UTILIZES STORED TEMPLATES TO CREATE A TEMPLATE-TREATED IMAGE

(75) Inventor: Takeshi Hori, Izumi (JP)

(73) Assignee: Funai Electric Co., Ltd., Osaka (JP)

( * ) Notice: Subject to any disclaimer, the term of this patent is extended or adjusted under 35 U.S.C. 154(b) by 1577 days.

(21) Appl. No.: 11/342,642

(22) Filed: Jan. 31, 2006

(65) Prior Publication Data

US 2006/0171004 A1 Aug. 3, 2006

(30) Foreign Application Priority Data

Feb. 2, 2005 (JP) ................................ 2005-025949

(51) Int. Cl.
*G06K 15/00* (2006.01)
(52) U.S. Cl. ...................................................... 358/1.18
(58) Field of Classification Search .................... 358/1.9, 358/518, 500; 348/207.1
See application file for complete search history.

(56) References Cited

U.S. PATENT DOCUMENTS

| | | | | |
|---|---|---|---|---|
| 5,684,509 | A * | 11/1997 | Hatanaka et al. | 345/615 |
| 6,266,129 | B1 * | 7/2001 | Uzawa et al. | 355/40 |
| 6,473,522 | B1 * | 10/2002 | Lienhart et al. | 382/168 |
| 2003/0169343 | A1 * | 9/2003 | Kagaya et al. | 348/207.1 |
| 2004/0125423 | A1 * | 7/2004 | Nishi et al. | 358/537 |
| 2004/0197027 | A1 * | 10/2004 | Kokemohr | 382/254 |
| 2007/0009028 | A1 * | 1/2007 | Lee et al. | 375/240.08 |

FOREIGN PATENT DOCUMENTS

| | | |
|---|---|---|
| JP | 62-293886 A | 12/1987 |
| JP | H09-27897 A | 1/1997 |
| JP | 10-334213 A | 12/1998 |
| JP | 2000-270198 A | 9/2000 |
| JP | 2000-292852 A | 10/2000 |
| JP | 2003-216935 A | 7/2003 |
| JP | 2004-096487 A | 3/2004 |

OTHER PUBLICATIONS

Japanese Office Action of corresponding Japanese Patent Application No. 2005-025949 dated Jan. 12, 2011.
Japanese Office Action of corresponding JP Application No. 2005-025949 dated Sep. 7, 2010.

* cited by examiner

*Primary Examiner* — Benny Tieu
*Assistant Examiner* — Jeremiah Bryar
(74) *Attorney, Agent, or Firm* — Global IP Counselors

(57) ABSTRACT

A photoprinter includes an image input unit through which an original image is configured to be inputted; a display unit configured to display an image; a printing unit configured to print the image displayed on the display unit; an operation input unit adapted to receive an instruction from a user; a template storage unit configured to store a template including an outer guide and an inner guide; and a control unit operatively connected to the image input unit, the display unit, the printing unit, the operation input unit, and the template storage unit. The control unit is configured to create a template-treated image from the original image by displaying a template over the original image on the display unit, and trimming an area of the original image outside the outer guide of the template and performing segmentation around the inner guide.

8 Claims, 7 Drawing Sheets

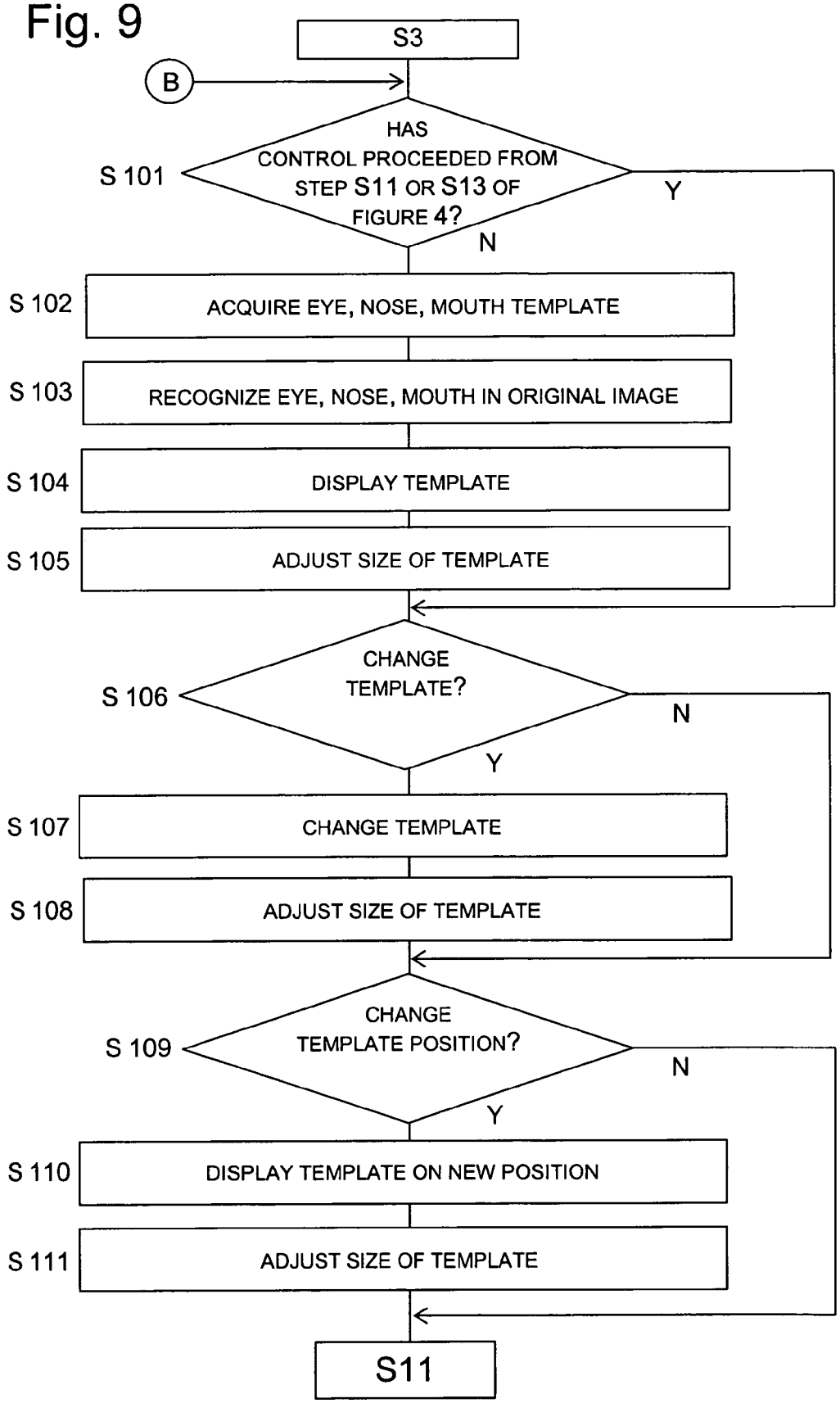

PHOTOPRINTER THAT UTILIZES STORED TEMPLATES TO CREATE A TEMPLATE-TREATED IMAGE

CROSS-REFERENCE TO RELATED APPLICATIONS

This application claims priority to Japanese Patent Application No. 2005-025949. The entire disclosure of Japanese Patent Application No. 2005-025949 is hereby incorporated herein by reference.

BACKGROUND OF THE INVENTION

1. Field of the Invention

The present invention generally relates to a photoprinter. More specifically, the present invention relates to a photoprinter capable of creating identification photographs such as passport photographs.

2. Background Information

The idea of employing image processing in devices that are specifically designed to take identification photographs has already been proposed.

Although the increased popularity of digital cameras and photoprinters allows people to take photographs at home with relative ease, people who need identification photographs still need to use image photographing devices specifically designed to take identification photographs like those described above, because of the photograph size and face image size restrictions of identification photographs. Consequently, it is time-consuming and costly for a user to have to avail himself/herself to such image photographing device.

Therefore, it would be evidently more convenient if a user could easily process one's own photograph in order to create an identification photograph. In order to create an identification photograph, it is necessary to trim the background of the photograph. There are existing photoprinters that enable a user to process data acquired using an image capturing device, trim unnecessary data, and add text to the photograph. However, there are no photoprinters that allow a user to easily create an identification photograph.

In view of the above, it will be apparent to those skilled in the art from this disclosure that there exists a need for an improved photoprinter that overcomes the above described problems. This invention addresses this need in the art as well as other needs, which will become apparent to those skilled in the art from this disclosure.

SUMMARY OF THE INVENTION

The present invention provides a photoprinter that enables a user to obtain a photograph having a predetermined size and a predetermined background in a simple fashion from a digital photograph.

The present invention achieves the aforementioned object by offering a photoprinter having the following constituent features.

A photoprinter includes an image input unit through which an original image is configured to be inputted; a display unit configured to display an image; a printing unit configured to print the image displayed on the display unit; an operation input unit adapted to receive an instruction from a user; a template storage unit configured to store a template including an outer guide and an inner guide; and a control unit operatively connected to the image input unit, the display unit, the printing unit, the operation input unit, and the template storage unit. The control unit is configured to create a template-treated image from the original image by displaying a template over the original image on the display unit, and trimming an area of the original image outside the outer guide of the template and performing segmentation around the inner guide.

With such photoprinter, when an original image is inputted to the photoprinter, the original image can be displayed on the display unit with a template being displayed over the original image. The outer guide of the template is for designating the size of the template-treated identification photograph, while the inner guide of the template is for approximately indicating the outer contour of the person in the photograph, such that segmentation can be performed around the inner guide. The portion of the photograph between the outer guide and the inner guide can be erased as background content.

As a result, with the present invention, a photograph taken with a digital camera can be inputted to the photoprinter through the image input unit, such that the unnecessary portions of the photograph can be trimmed and erased using an identification photograph template, and the resulting identification photograph can be printed out. As a result, an identification photograph can be obtained easily without bothering to go to a photography studio or other photographing facility.

In the photoprinter, the operation input unit preferably has a key, an operation of which results in at least one of an instruction to move the template displayed on the display device and an instruction to change a size of the template displayed on the display device.

With this photoprinter, the user of the photoprinter can adjust the position and/or size of the template. The size of the image can be adjusted by adjusting the size of the outer guide of the template, while the area in which the segmentation is to be conducted can be adjusted by moving or enlarging/reducing the inner guide of the template.

In the photoprinter the template storage unit is preferably configured to store a plurality of different templates, each template including an outer guide and an inner guide, the operation input unit is configured to receive a selection of a template by the user from among the plurality of templates stored in the template storage unit, and the control unit is further configured to create the template-treated image from the original image by trimming an area of the original image outside an outer guide of the selected template and performing segmentation around its inner guide.

With such photoprinter, a user of the photoprinter can select the most appropriate template for trimming the background portion from a particular image by using the operation input unit to acquire the desired template from the template storage unit. For example, templates can be prepared which have outer rectangular guide designed for passport photographs, license photographs, resume photographs, etc. Similarly, templates having different shapes of inner guide can be prepared, such as Ω-shape for males and U-shape for females.

In the photoprinter, the template storage unit is preferably further configured to store a face template, and the control unit is further configured to extract a face image from the original image displayed on the display device based on the face template, and display the template over the extracted face image.

With such photoprinter, the time and effort required to adjust the template manually can be reduced. For example, patterns of a person's eyes, nose, and mouth and these patterns can be used to detect the features of a subject's face to determine the position of the subject's face.

In the photoprinter, the control unit is preferably further configured to adjust a size of the template such that the extracted face image fits inside the inner guide of the template.

With such photoprinter, the time and effort required to adjust the template manually can be reduced. Similarly to automatic positioning of the template described above, the automatic adjustment of the size of the template can be accomplished by establishing patterns that correspond to the shapes of a person's eyes, nose, and mouth.

In the photoprinter, the outer guide of the template has a rectangular shape, and the inner guide of the template has a curved shape.

With the present invention, a photograph taken with a digital camera can be inputted to a photoprinter through an image input unit, such that unnecessary portions of the photograph can be trimmed and erased using a photograph template, and the resulting photograph having a predetermined size and a predetermined background can be printed out. As a result, a photograph of a predetermined size with a predetermined background, such as identification photographs, can be obtained easily without having to go to a photography studio or other photographing facility.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 9 is a flowchart of a partial routine regarding the operations of a face image extracting unit, an automatic template arranging unit, an automatic template adjusting unit, and a face template storage unit in accordance with the second embodiment.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
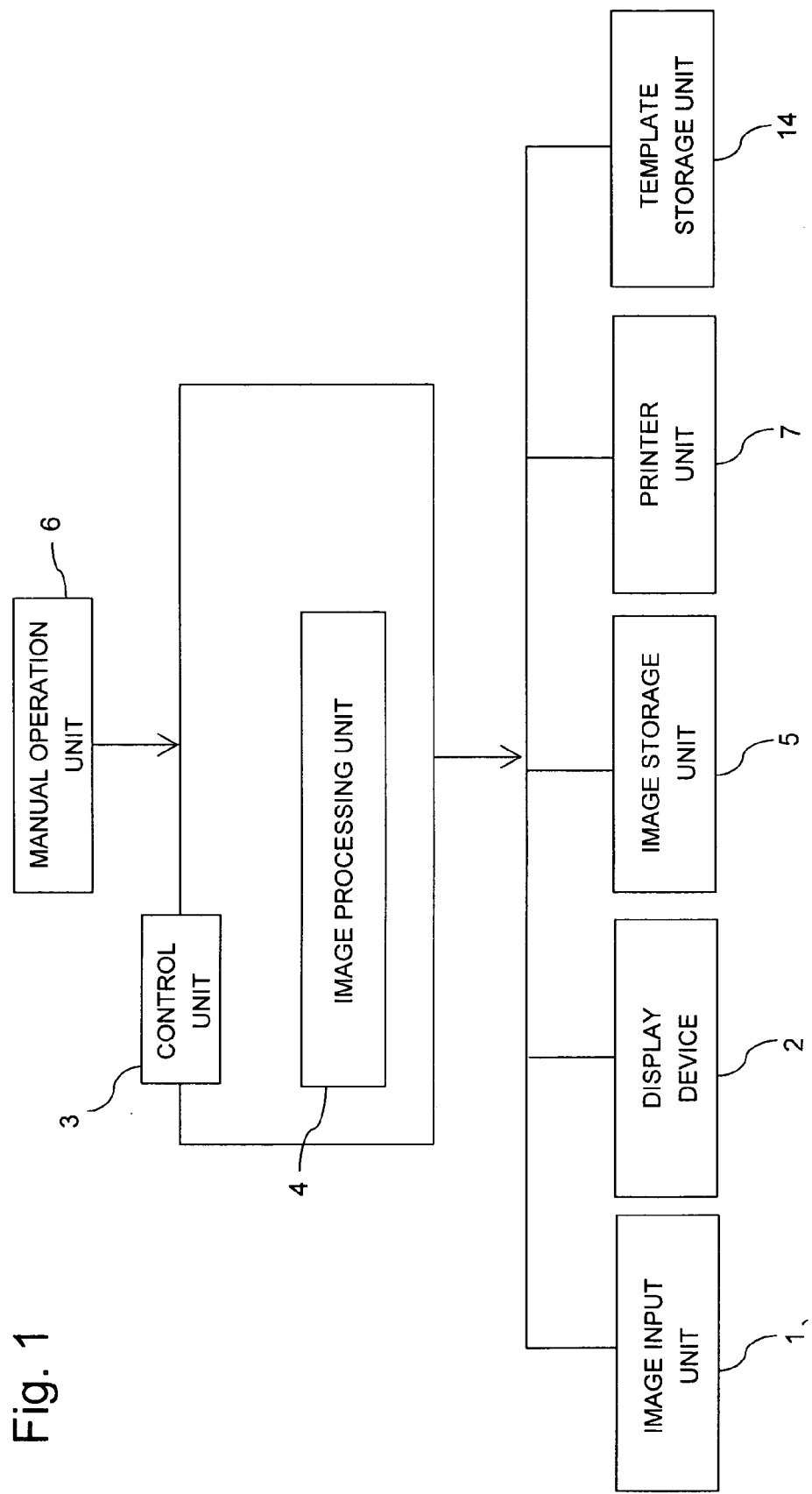
FIG. 1 is a block diagram of the internal components of a photoprinter in accordance with a first embodiment of the invention.
Figure 2:
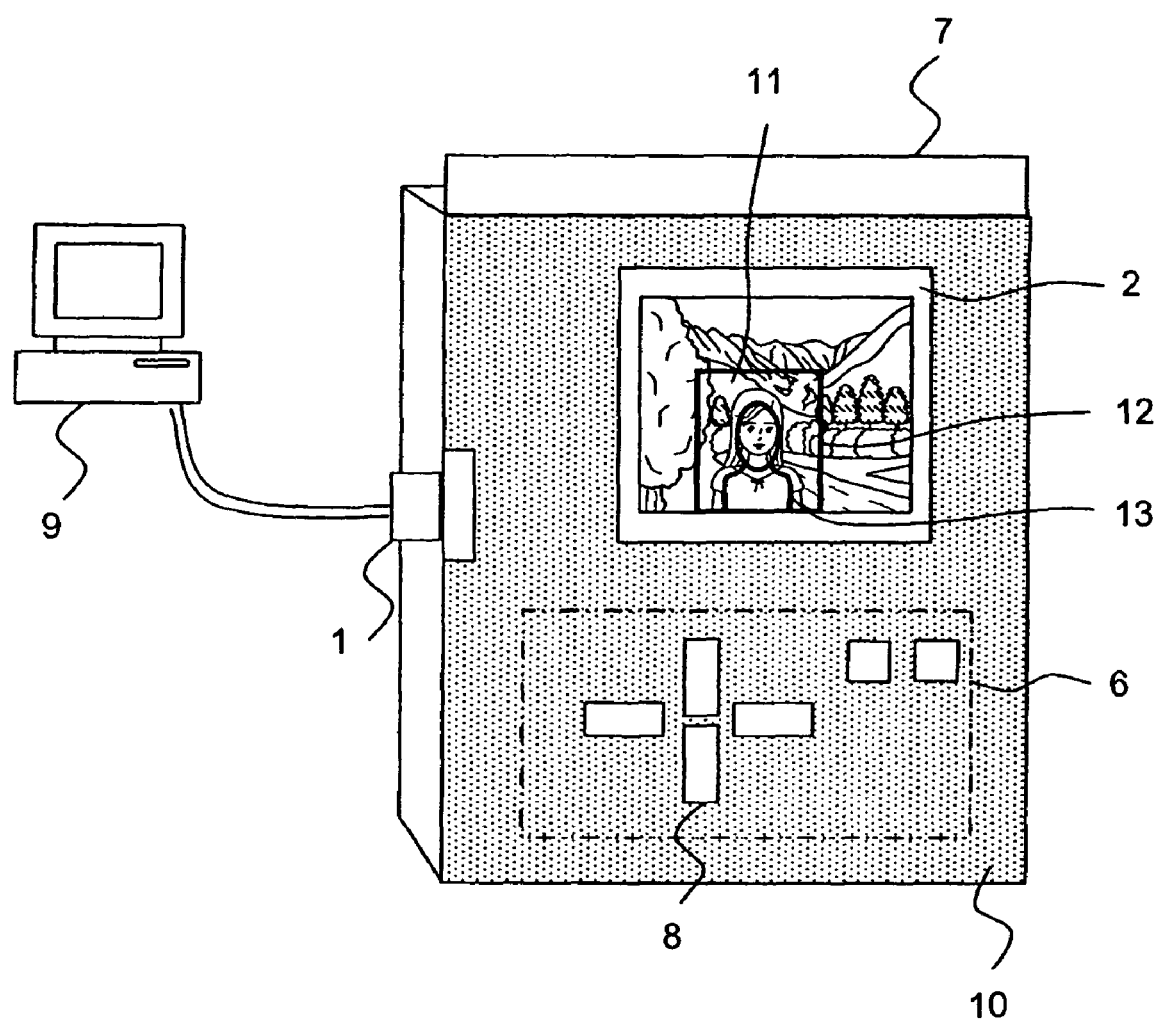
FIG. 2 is diagrammatic view of a photoprinter in accordance with the first embodiment of the invention.

FIG. 1 is a block diagram of the internal components of a photoprinter in accordance with a first embodiment of the present invention and FIG. 2 is a diagrammatic view of a photoprinter in accordance with the first embodiment.

As shown in FIG. 1, a photoprinter 10 in accordance with this embodiment includes a manual operation unit 6 configured to issue instructions for operating the photoprinter 10, a control unit 3 configured to execute operations in accordance with the instructions from the manual operation unit 6, an image input unit 1, a display device 2, an image storage unit 5, a printer unit 7, and a template storage unit 14. The control unit 3 includes conventional components such as an input interface circuit, an output interface circuit, and storage devices such as a ROM (Read Only Memory) device and a RAM (Random Access Memory) device. The control unit 3 is operatively connected to the image input unit 1, the display device 2, the image storage unit 5, the printer unit 7, and the template storage unit 14 so as to be able to selectively control any of the units connected thereto.

The manual operation unit 6 is configured such that an identification photograph creating mode for creating identification photographs can be selected, which triggers the control unit 3 to execute an identification photograph creation routine (see FIGS. 3 and 4, discussed later). As will be described later, the manual operation unit 6 also has keys associated with moving the template up and down (vertically) and left and right (horizontally) and keys associated with enlarging and reducing the template. For example, the manual operation unit 6 might be provided with cursor keys 8 like those shown in FIG. 2.

Figure 5:
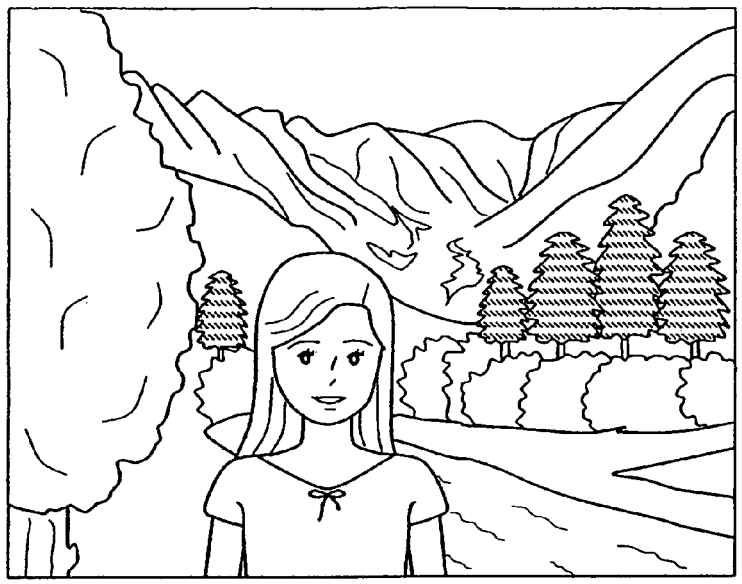
FIG. 5 shows an example of a photograph received via the image input unit.

The image input unit 1 is configured to receive original image data from an outside source. In this embodiment, the image input unit 1 is configured to be connected to a computer 9 and receive image data from there or configured to receive image data from a card-type storage medium with a card reader. Details of such card reader and card-type storage medium will now be described herein since such card reader and card-type storage medium are well known in the art. In this embodiment, data of an image such as one shown in FIG. 5 are received from a computer 9 via the image input unit 1. However, the image input unit 1 can also be connected to, for example, a data storage card for a digital camera.

Controlled by the control unit 3, the display device 2 displays the image of the data obtained from the image input unit 1. The manual operation unit 6 is configured such that a user can select a prescribed image while viewing the display device 2.

Controlled by the control unit 3, the image storage unit 5 can store the selected image and also store the same image after it has been processed (as described later).

The printer unit 7 prints the image. In other words, when an instruction to print is issued from the manual control unit 6, the control unit 3 executes control of the printer unit 7 such that the printer unit 7 prints the image displayed on the display device 2.

The template storage unit 14 stores a variety of templates. A template is acquired and displayed on the display device 2 through control operations executed by the control unit 3.

Figure 6:
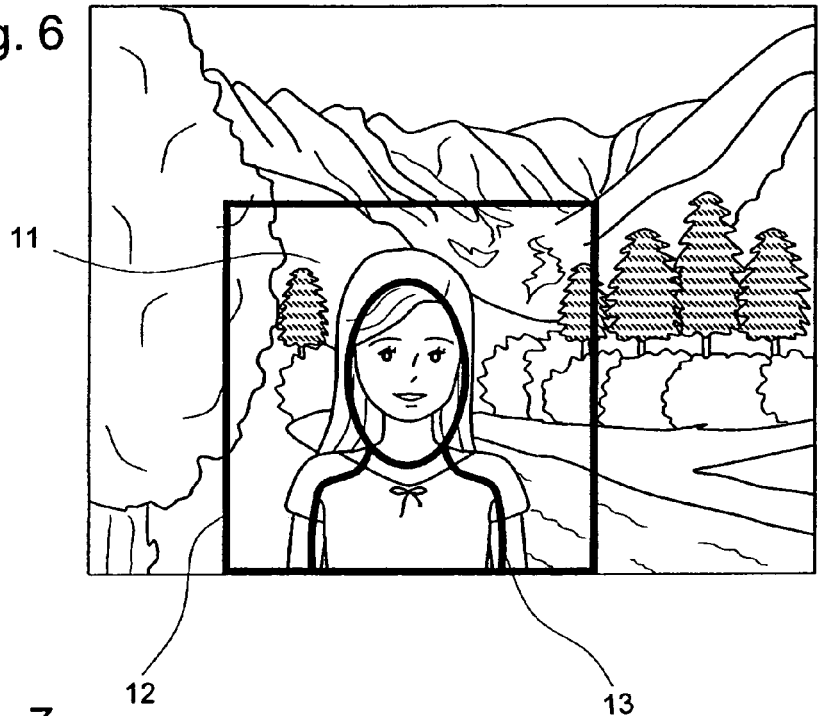
FIG. 6 shows an example of what is displayed on a display device when the identification photograph creating mode is selected.

FIG. 6 shows an example of what is displayed on the display device 2 when the identification photograph creating mode is selected. Each of the templates includes an outer rectangular guide 12 and an inner curved guide 13. The outer rectangular guide 12 of a template is designed to correspond to the size of passport photograph, license photograph, resume photograph, or other identification photograph with a predetermined size, such that the area outside the outer rectangular guide 12 can be trimmed. The inner curved guide 13 is provided so as to approximately fit with the contour of the subject. The inner curved guide 13 serves as guidance when the background of the original image data is erased by segmentation as described later. Thus, the inner curved guide 13 only needs to fit with the contour of the subject approximately.

In the template storage unit 14, a plurality of inner curved shapes 13 are stored, such as Ω-shaped one for males and a U-shaped one for females. There are keys that are provided on the manual operation unit 6 so that the user can move the template vertically or horizontally, and that enlarge or reduce the image with manual operations. The template displayed on the display device 22 can be altered in position and size by the control unit 3, to which the user issues instructions to move and/or reduce/enlarge the template through the manual control unit 6.

The control unit 3 is configured to control the various devices (as mentioned earlier) and includes an image processing unit 4. In the identification photograph creating mode, the image processing unit 4 trims the area outside the outer rectangular guide 12 of the template, erases the background of the original image, applies a certain color to the background, and creates a composite image, which is a template-treated image and can be used as an identification photograph and have a background of a specific color.

The image storage unit 5 is configured to store the composite images created by the image processing unit 4 in response to commands from the control unit 3 to do so. The printer unit 7 is configured to print composite images created by the image processing unit 4. Where the image shown in FIG. 5 is the original image, the resulting composite image printed image might be, for example, the one shown in FIG. 7.

Figure 3:
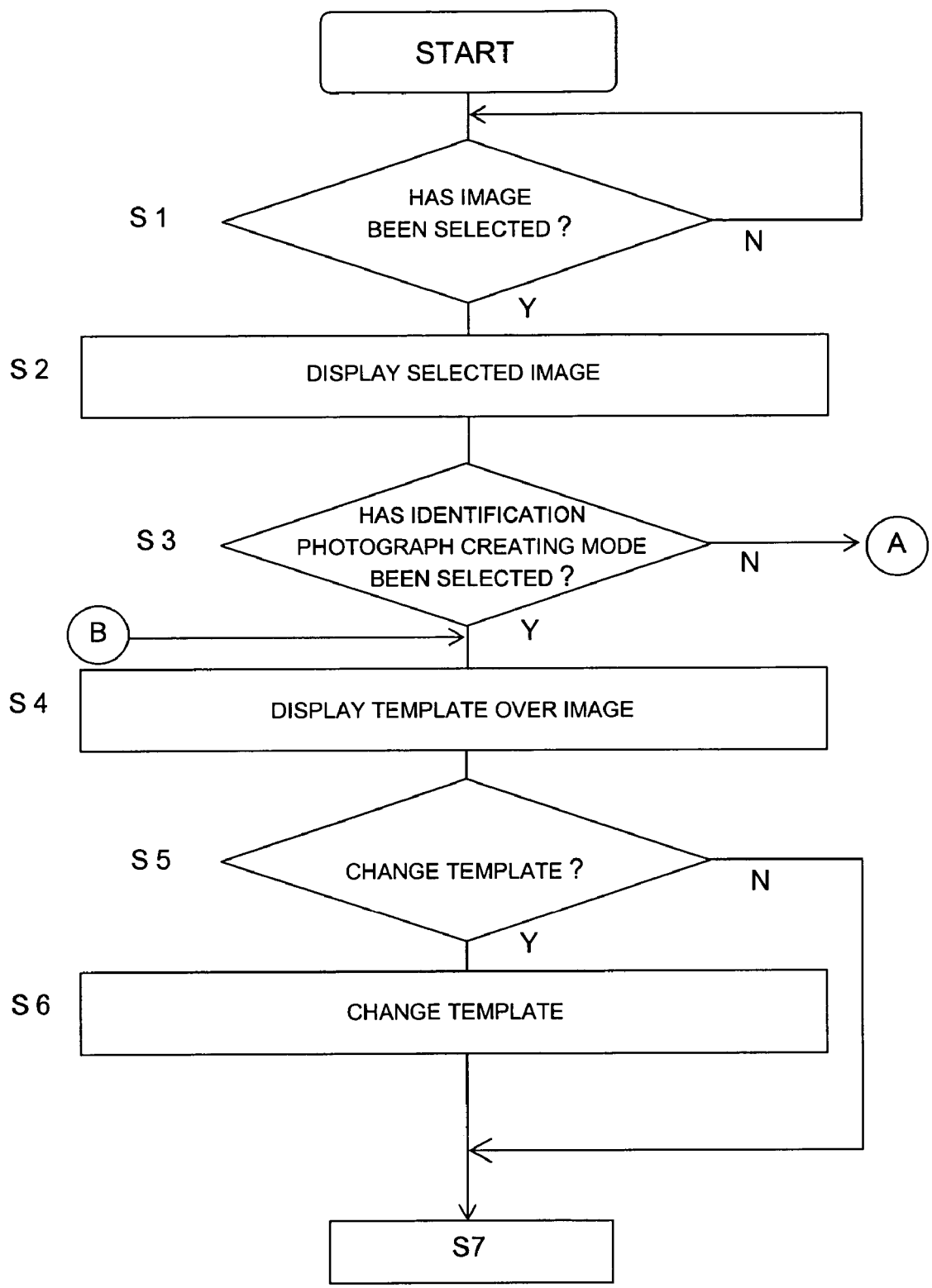
FIG. 3 is a flowchart of the main routine executed by a photoprinter in accordance with the first embodiment.
Figure 4:
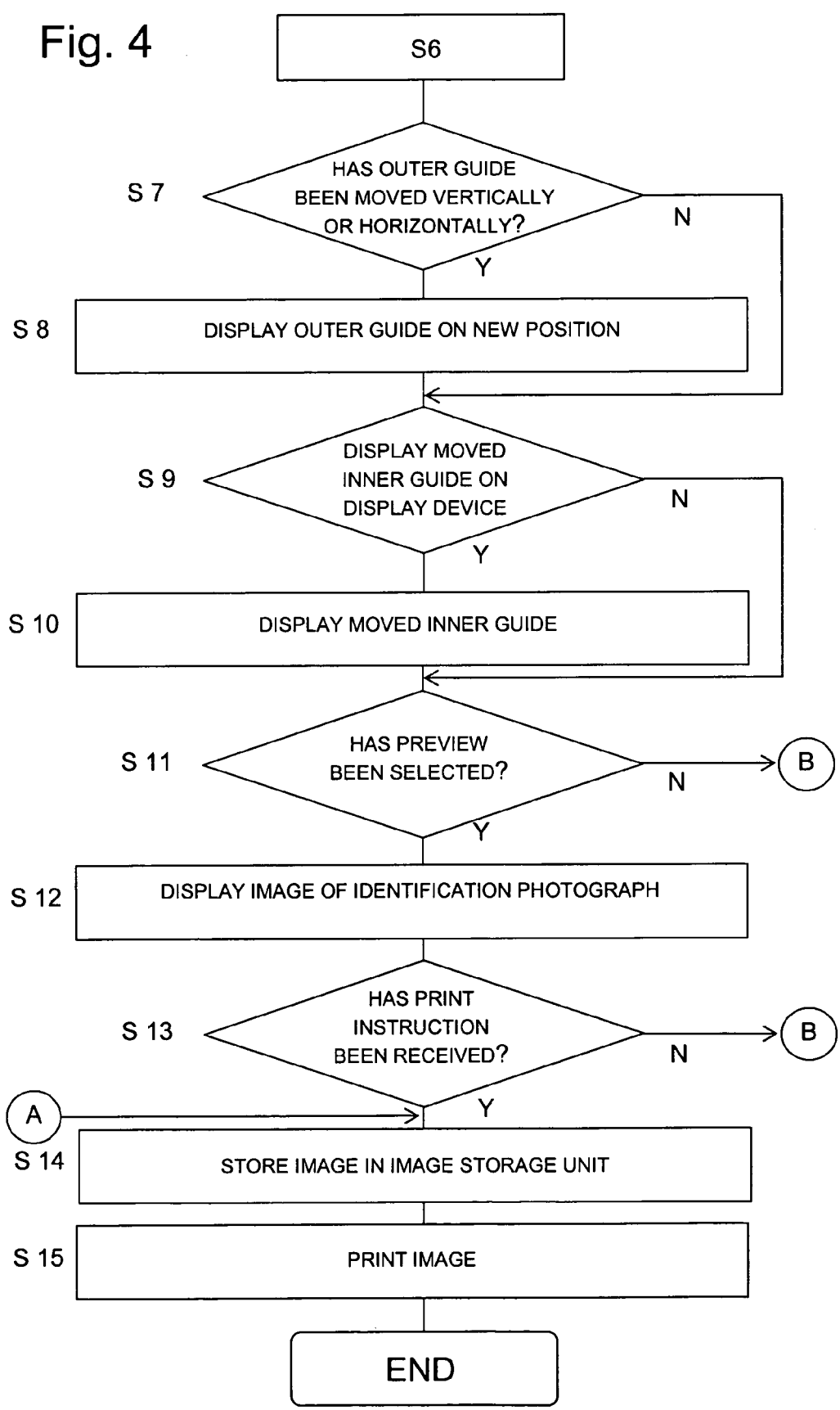
FIG. 4 is a flowchart of the main routine executed by a photoprinter in accordance with the first embodiment continuing from FIG. 3.

FIGS. 3 and 4 are flowcharts of the main control routine to be executed by the control unit 3 in the first embodiment. In step S1, the control unit 3 checks if any of the original images inputted to the image input unit 1 has been selected for processing. If the user has selected an image using the manual operation unit 6 (Y), the control unit 3 proceeds to step S2. If no particular image has been selected (N), the control unit 3 waits until an image is selected.

In step S2, the control unit 3 displays the image selected using the manual operation unit 6 on the entire screen of the display device 2. In this embodiment, the image shown in FIG. 5 is received through the image input unit 1 as the original image and displayed on the display device 2.

In step S3, the control unit 3 determines if the identification photograph creating mode has been selected. More specifically, the control unit 3 determines if it has received a signal from the manual operation unit 6 indicating that the identification photograph creating mode has been selected. If the identification photograph creating mode is selected (Y), the control unit 3 proceeds to step S4. If not (N), the control unit 3 proceeds to step S14 to print the image selected in step S1. Although it is possible with the photoprinter of the present embodiment to perform image processing other than the processing for creating identification photographs before the image is printed, details of such other image processing will not be discussed herein.

In step S4, the outer rectangular guide 12 and the inner curved guide 13 of the template are displayed over the image selected in step S1 using the manual operation unit 6. For example, the image might appear as shown in FIG. 6. As shown in FIG. 6, the outer rectangular guide 12 of the template is generally square-shaped, the inner curved guide 13 has an upper half that is generally round. The template is displayed over the image selected in step S1 using the manual operation unit 6. Although there are a plurality of templates stored in the template storage unit 14 (see FIG. 1), one default template out of those templates is displayed at a default location in step S4.

In step S5, the control unit 3 determines if a change of the template is requested. If so (Y), the control unit 3 proceeds to step S6. If not (N), the control unit 3 skips step S6 and proceeds to step S7 shown in FIG. 4. The photoprinter 10 is configured such that the user can select a template using the cursor keys 8 of the manual operation unit 6 when the photoprinter 10 is in the identification photograph creating mode.

In step S6, the control unit 3 acquires a different template from the template storage unit 14 and replaces the template currently displayed on the display device 2 with the newly selected one.

In step S7 shown in FIG. 4, the control unit 3 determines if an instruction has been issued to move the outer rectangular guide 12 of the template vertically or horizontally, or to enlarge or reduce the outer rectangular guide 12. More specifically, the control unit 3 determines if a signal has been received from the manual operation unit 6 indicating that a user has moved the outer rectangular guide 12 vertically or horizontally or that the user has enlarged or reduced the outer rectangular guide 12. If such signal has been received from the manual operation unit 6 (Y), the control unit 3 proceeds to step S8. If such signal has not been received (N), the control unit 3 proceeds to step S9. The size of the outer rectangular guide 12 of the template is not allowed to be reduced to such a degree that it intersects with the inner curved guide 13 of the template. The user performs the movement, enlargement, and reduction of the outer rectangular guide 13 using, for example, the cursor keys 8 of the manual operation unit 6 shown in FIG. 2.

In step S8, if the outer rectangular guide 12 is moved vertically or horizontally or if the size of the outer rectangular guide 12 is changed in step S7, the control unit 3 re-displays the outer rectangular guide 12 of the template in its new position and size. Here, the outer rectangular guide 12 has a shape that is designated for a particular use, such as passport picture, driver's license picture, or resume picture. Thus, when the user changes the size of the outer rectangular guide 12 in step S7, the outer rectangular guide 12 is proportionally enlarged and reduced while maintaining the ratio between its vertical length and lateral length.

In step S9, the control unit 3 determines if an instruction has been issued to move the inner curved guide 13 of the template vertically or horizontally, or to enlarge or reduce the inner curved guide 13. More specifically, the control unit 3 determines if a signal has been received from the manual operation unit 6 indicating that a user has moved the inner curved guide 13 vertically or horizontally, or that the user has enlarged or reduced the inner curved guide 13. If such signal has been received from the manual operation unit 6 (Y), the control unit 3 proceeds to step S10. If such signal has not been received (N), the control unit 3 proceeds to step S11. When the inner curved guide 13 of the template is moved or enlarged/reduced, the inner curved guide 13 is not allowed to intersect with the outer rectangular guide 12 of the template.

In step S10, if the inner curved guide 13 is moved vertically or horizontally, or if the size of the inner curved guide 13 is changed in step S9, the control unit 3 re-displays the inner curved guide 12 of the template in its new position and size.

In step S11, the control unit 3 asks the user of the photoprinter 10 whether a preview of the identification photograph should be displayed so as to proceed with the printing. If the user chooses to display a preview and proceed with the printing (Y), the control unit 3 proceeds to step S12. If the user does not choose to display a preview (N), the control unit 3 proceeds to step S4, where the original image and the default template are displayed again.

In step S12, the image processing unit 4 of the control unit 3 performs the trimming and segmentation on the image. During the trimming, an area of the original image outside the outer rectangular guide 12 is cut off. Also, the image processing unit 4 performs segmentation on the image around the inner curved guide 13 of the template. As a result of the trimming, the background 11, which is the image other than the subject, is erased, and is replaced with a predetermined color such as white. While various segmentation technologies are well known in the art, any of such segmentation technologies can be utilized in the photoprinter of the present embodiment. Thus, further details of such trimming or segmentation will not be discussed herein. Examples of segmentation methods are shown in U.S. Pat. Nos. 6,608,929 and 6,813,379, and U.S. Patent Application Publication Ser. No. 2003/0219157, which are incorporated herein by reference.

Figure 7:
FIG. 7 shows an example of a completed identification photograph.

After the image processing, the control unit 3 displays a print preview of the template-treated identification photograph. The resulting composite photograph can be, for example, as shown in FIG. 7. This image is a composite image created by the image processing unit 4 in response to instructions from the control unit 3, and only includes a region within the outer rectangular guide 12 of the template, with the background 11 being white.

In step S13, the control unit 3 determines if an instruction to print has been issued from the manual operation unit 6. More specifically, the control unit 3 determines if the user has instructed with the manual operation unit 6 to print the image. If so (Y), the control unit 3 proceeds to step S14. If it receives an instruction not to print (N), the control unit 3 returns to step S4.

In step S14, the control unit 3 stores the composite image created by the image processing unit 4 in the image storage unit 5.

In step S15, the control unit 3 instructs the printer unit 7 to print the image stored in the image storage unit 5 and ends the routine. The resulting photograph thus printed is, for example, as shown in FIG. 7.

Second Embodiment

Figure 8:
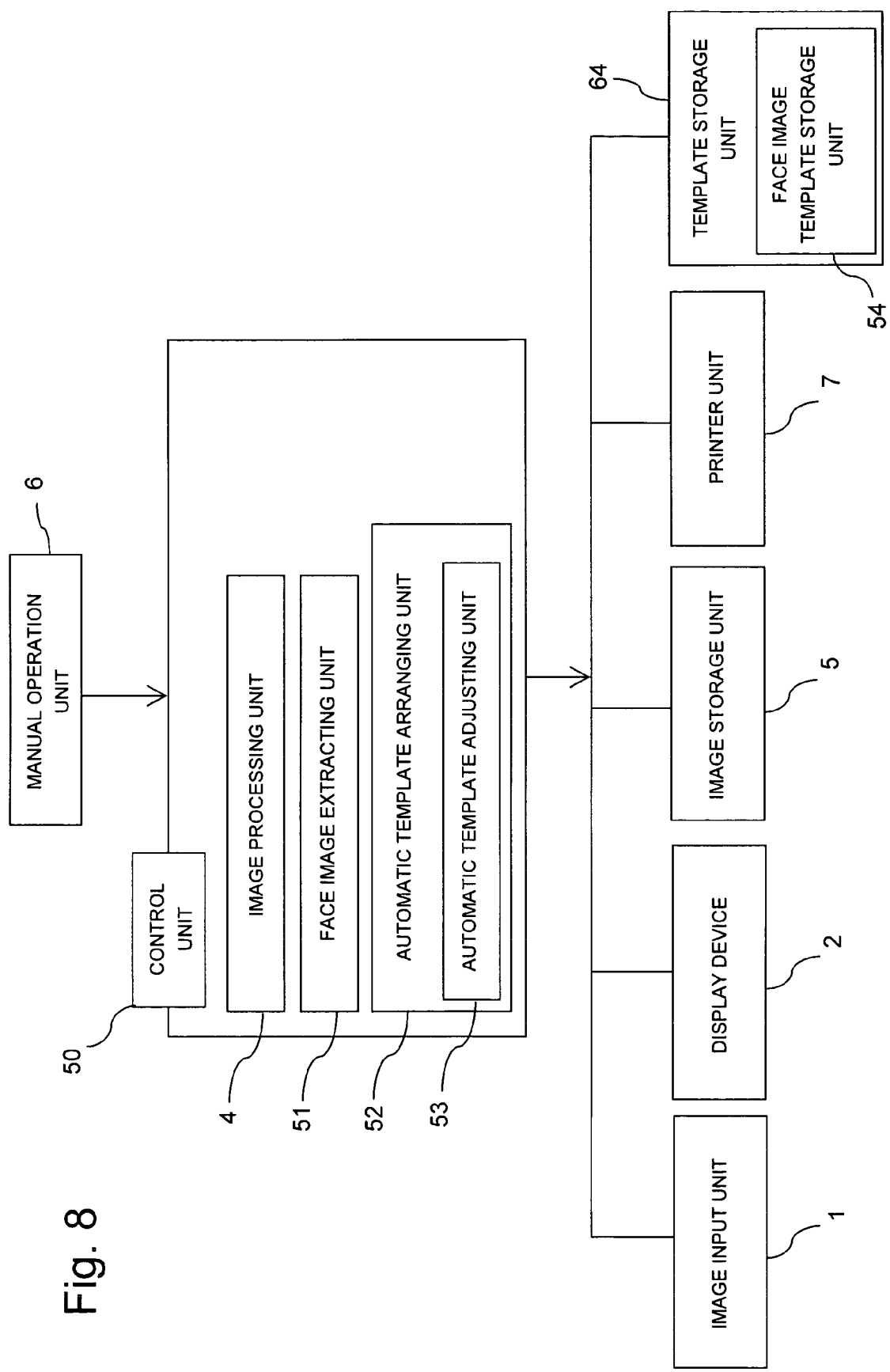
FIG. 8 is a block diagram of the internal components of a photoprinter in accordance with a second embodiment.

Referring now to FIGS. 8-9, a photoprinter in accordance with a second embodiment will now be explained. In view of the similarity between the first and second embodiments, the parts of the second embodiment that are identical to the parts of the first embodiment will be given the same reference numerals as those of the first embodiment. Moreover, the descriptions of the parts of the second embodiment that are identical to the parts of the first embodiment may be omitted for the sake of brevity.

The second embodiment is different from the first embodiment in that that the position and the size of the template are adjusted automatically instead of manually by the user as in the first embodiment.

FIG. 8 is a block diagram of the internal components of a second embodiment. The control unit 50 of the second embodiment is similar to the control unit 3 of the first embodiment, except that the control unit 50 further includes a face image extracting unit 51, an automatic template arranging unit 52. Furthermore, an automatic template adjusting unit 53 is included in the automatic template arranging unit 52. Still furthermore, the template storage unit 64 of the second embodiment is similar to the template storage unit 14 of the first embodiment, except that a face template storage unit 54 is included inside the template storage unit 64. The automatic adjustment of the position and the size of the template is performed using the face image extracting unit 51, the automatic template arranging unit 52, the automatic template adjusting unit 53, and the face template storage unit 54.

The face template storage unit 54 stores a face template therein. The face image extracting unit 51 is configured to acquire the face image template from the face template storage unit 54 and extract a face image from the original an image inputted through the image input unit 1, and determine the position of the face image.

FIG. 9 is a partial flowchart of a routine for arranging the image template in accordance with the second embodiment. This partial routine replace steps S4 to S10 of the main routine of the first embodiment.

The partial flow chart shown in FIG. 9 is started when the identification photograph creating mode is selected in step S3 shown in FIG. 3, when the user chooses not to display a preview of the identification photograph in step S11 shown in FIG. 4, or when the user chooses not to print the identification photograph in step S13.

In step S101 of the routine, the control unit 50 determines if it has returned from step S11 or S13 shown in FIG. 4, in other words whether this is the first time the routine of FIG. 9 is performed on this original image data. If the control unit 50 has returned from step S11 or S13 (Y), the control unit 50 skips steps S102 to S105 and proceeds to step S106. The first time the routine is executed, the result of step S101 is N and the control unit 50 proceeds to step S102.

In step S102, the face image extracting unit 51 obtains eyes, nose, and mouth pattern data from the face template storage unit 54. The pattern data includes data regarding the relative positioning of the eyes, nose, and mouth.

In step S103, the face image extracting unit 51 identifies a position in the original image received from the image input unit 1 where the pattern of an eye, nose, or mouth can be found. When such position is identified, the face image extracting unit 51 stores such position. If a plurality of such positions is found, the face image extracting unit 51 recognizes those positions as a face image. While various face image recognition technologies are well known in the art, any of such face image recognition technologies can be utilized in the photoprinter of the present embodiment. Examples of such face recognition technologies are disclosed in U.S. Pat. Nos. 5,309,228, 5,629,752, and 6,549,899, and U.S. Patent Applications Ser. Nos. 2001/0005222, 2002/0191818, and 2004/0119851, which are incorporated herein by reference. Since these face image recognition technologies are well known in the art detailed explanation thereof will be omitted herein.

In step S104, the automatic template arranging unit 52 positions a template in one of the face positions extracted by the face image extracting unit 51. Although the template storage unit 64 stores a plurality of templates therein, at this point, one default template is displayed with the outer rectangular guide 12 and the inner curved guide 13 each having a default size.

In step S105, the automatic template adjusting unit 53 adjusts the size of the template based on the extracted face image. Since the approximate size of the face image can be derived from the eye, nose, and mouth pattern, the size of the inner circular guide 13 of the template can be determined based on the size of the face image. While various face size matching technologies are well known in the art, any of such face size matching technologies, such as the face recognition technologies discussed above, can be utilized in the photoprinter of the present embodiment. Since these face size matching technologies are well known in the art detailed explanation thereof will be omitted herein.

In step S106, the control unit 50 determines if a change of the template is requested. If so (Y), the control unit 50 proceeds to step S107. If not (N), the control unit 50 skips steps S107 and S108 and proceeds to step S109. The photoprinter 10 is configured such that the user can select a template using the cursor keys 8 of the manual operation unit 6 when the photoprinter 10 is in the identification photograph creating mode.

In step S107, the control unit 50 changes the template and displays it on the display device 2.

In step S108, the template size is adjusted in the same manner as in step S105, such that the inner curved guide 13 of the template approximately matches the face image extracted in step S103.

In step S109, the control unit 50 determines if a change in the position of the template is requested. The user may wish to change the position of the template where, for example, the face image extracting unit 51 recognized two or more faces in step S103. In this manner, a single face image can be selected when a photograph having images of two or more people is used as the original image. More specifically, if two or more face position data are obtained (i.e., if two or more face images are recognized) in step S103, then the cursor keys 8 can be used in a manner different from the selection of the template in step S106 to selected a desired face from among the plurality of face images in the original data. If a change in the position of the template is requested (Y), the control unit 50 changes the position of the template in step S107. Otherwise (N), the control unit 50 skips steps S110 and S111 and proceeds to step S11 shown in FIG. 4.

In step S110, the control unit 50 changes the position of the template based on the face position data where that has been changed in step S109.

In step S111, the template size is adjusted in the same manner as in step S105, such that the inner curved guide 13 of the template approximately matches the face image extracted in step S103.

After step S111, the control unit 50 proceeds to step S11. As clearly seen in FIG. 4, the routine shown in FIG. 9 is repeated when the user chooses when the user chooses not to display a preview of the identification photograph in step S11 shown in FIG. 4, or when the user chooses not to print the identification photograph in step S13.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A photoprinter, comprising:
an image input unit through which an original image is configured to be inputted;
an image storage unit configured to store the original image;
a display unit configured to display an image;
a printing unit configured to print the image displayed on the display unit;
an operation input unit adapted to receive an instruction from a user;
a template storage unit configured to store a template including an outer guide and an inner guide, the template being stored separately from the original image; and
a control unit operatively connected to the image input unit, the display unit, the printing unit, the operation input unit, and the template storage unit, the control unit being configured to create a template-treated image from the original image by displaying the template over the original image on the display unit with the outer guide of the template being displayed within the original image as an area smaller than the original image and the inner guide of the template being displayed within the outer guide of the template as an area smaller than the outer guide of the template, and trimming an area of the original image outside the outer guide of the template and performing segmentation around the inner guide of the template,
the inner guide of the template having an upper circular portion and a lower curved portion, the inner guide of the template being displayed over the original image on the display unit such that the upper circular portion of the inner guide is superposed on a contour of a head portion of a person in the original image on the display unit and the lower curved portion of the inner guide is superposed on a contour of an upper body portion of the person in the original image on the display unit.

2. The photoprinter recited in claim 1, wherein
the operation input unit has a key, an operation of which results in at least one of an instruction to move the template displayed on the display unit and an instruction to change a size of the template displayed on the display unit.

3. The photoprinter recited in claim 1, wherein
the template storage unit is configured to store a plurality of different templates, each template including an outer guide and an inner guide,
the operation input unit is configured to receive a selection of a template by the user from among the plurality of templates stored in the template storage unit, and
the control unit is further configured to create the template-treated image from the original image by trimming an area of the original image outside an outer guide of the selected template and performing segmentation around its inner guide.

4. The photoprinter recited in claim 1, wherein
the template storage unit is further configured to store a face template, and
the control unit is further configured to extract a face image from the original image displayed on the display unit based on the face template, and display the template over the extracted face image.

5. The photoprinter recited in claim 4, wherein
the control unit is further configured to adjust a size of the template such that the extracted face image fits inside the inner guide of the template.

6. The photoprinter recited in claim 1, wherein
the outer guide of the template has a rectangular shape, and the inner guide of the template has a curved shape.

7. A photoprinter, comprising:
an image input unit through which an original image is configured to be inputted;
an image storage unit configured to store the original image;
a display unit configured to display an image;
a printing unit configured to print the image displayed on the display unit;
a manual operation input unit adapted to receive an instruction from a user;
a template storage unit configured to store a plurality of different templates, each template including a rectangular outer guide and a curved inner guide, the templates being stored separately from the original image; and
a control unit operatively connected to the image input unit, the display unit, the printing unit, the manual operation input unit, and the template storage unit, the control unit being configured to display one of the templates over the original image on the display unit with the outer guide of the one of the templates being displayed within the original image as an area smaller than the original image and the inner guide of the one of templates being displayed within the outer guide of the one of the templates as an area smaller than the outer guide of the one of the templates,
the manual operation input unit having a key, an operation of which results in at least one of an instruction to move the one of the templates displayed on the display unit and an instruction to change a size of the one of the templates displayed on the display unit,
the manual operation input unit being further configured to receive a selection by the user of the one of the templates,
the control unit being further configured to create a template-treated image from the original image by trimming an area of the original image outside the outer guide of the one of the templates and performing a segmentation around the inner guide of the one of the templates,
the inner guide of the one of the templates having an upper circular portion and a lower curved portion, the inner guide of the one of the templates being displayed over the original image on the display unit such that the upper circular portion of the inner guide is superposed on a contour of a head portion of a person in the original image on the display unit and the lower curved portion of the inner guide is superposed on a contour of an upper body portion of the person in the original image on the display unit.

8. A photoprinter, comprising:
an image input unit through which an original image is configured to be inputted;
an image storage unit configured to store the original image;
a display unit configured to display an image;
a printing unit configured to print the image displayed on the display unit;
an operation input unit adapted to receive an instruction from a user;
a template storage unit configured to store a template including an outer guide and an inner guide, the template being stored separately from the original image; and
a control unit operatively connected to the image input unit, the display unit, the printing unit, the operation input unit, and the template storage unit, the control unit being configured to create a template-treated image from the original image by displaying the template over the original image on the display unit with the outer guide of the template being displayed within the original image as an area smaller than the original image and the inner guide of the template being displayed within the outer guide of the template as an area smaller than the outer guide of the template, and trimming an area of the original image outside the outer guide of the template and performing segmentation around the inner guide of the template,
the control unit being configured to perform the segmentation around the inner guide of the template by replacing an area of the original image located between the outer guide of the template and the inner guide of the template with a predetermined color,
the inner guide of the template having an upper circular portion and a lower curved portion, the inner guide of the template being displayed over the original image on the display unit such that the upper circular portion of the inner guide is superposed on a contour of a head portion of a person in the original image on the display unit and the lower curved portion of the inner guide is superposed on a contour of an upper body portion of the person in the original image on the display unit.

* * * * *